(12) United States Patent
Lee

(10) Patent No.: US 12,363,217 B2
(45) Date of Patent: Jul. 15, 2025

(54) INTERACTIVE DISPLAY PLATFORM BETWEEN A USER DEVICE AND A DISPLAY SLATE

(71) Applicant: Albert Lee, Seoul (KR)

(72) Inventor: Albert Lee, Seoul (KR)

( * ) Notice: Subject to any disclaimer, the term of this patent is extended or adjusted under 35 U.S.C. 154(b) by 471 days.

(21) Appl. No.: 17/867,699

(22) Filed: Jul. 19, 2022

(65) Prior Publication Data

US 2023/0016071 A1 Jan. 19, 2023

(30) Foreign Application Priority Data

Jul. 19, 2021 (KR) .................. 10-2021-0094110

(51) Int. Cl.
| | |
|---|---|
| *H04M 1/72* | (2021.01) |
| *H04M 1/72412* | (2021.01) |
| *H04M 1/72457* | (2021.01) |
| *H04W 4/021* | (2018.01) |

(52) U.S. Cl.
CPC ... *H04M 1/72412* (2021.01); *H04M 1/72457* (2021.01); *H04W 4/021* (2013.01); *H04M 2250/22* (2013.01)

(58) Field of Classification Search
CPC .... H04M 1/72; H04M 1/724; H04M 1/72409; H04M 1/7212; H04M 1/72448; H04M 1/72457; H04M 2250/16; H04M 2250/22; H04W 4/02; H04W 4/021; H04W 12/50
See application file for complete search history.

(56) References Cited

U.S. PATENT DOCUMENTS

| | | | |
|---|---|---|---|
| 10,187,919 B2* | 1/2019 | Ledvina | H04W 4/80 |
| 11,283,533 B1* | 3/2022 | Gray | H04W 4/02 |
| 2016/0085713 A1* | 3/2016 | Glik | H04W 4/80 |
| | | | 710/304 |
| 2018/0084588 A1* | 3/2018 | Khoury | H04M 1/72412 |
| 2021/0185520 A1* | 6/2021 | Hassan | H04W 12/50 |

* cited by examiner

*Primary Examiner* — Quochien B Vuong
(74) *Attorney, Agent, or Firm* — ACUMEN LAW, PLLC

(57) ABSTRACT

In a user device such as a smartphone, frequent display screen activation causes undesirable power consumption and other inconveniences to the user, such as taking out his smartphone from a pocket to look at its screen, which increases the chances of his smartphone being dropped or damaged. Based upon such problem recognition, the present inventor conceived various inventive features that allow user relevant information to be provided onto a so-called display slate, without having to activate the display screen of the user device. Such an interactive display platform allows for performing a wireless pairing operation between a user device and at least one display slate located in proximity to the user device, providing, on the display slate, user relevant information related to or received from the user device without the screen of the user device being activated, and allowing, via the display slate, the user to interact with the user relevant information provided thereon.

20 Claims, 5 Drawing Sheets

INTERACTIVE DISPLAY PLATFORM BETWEEN A USER DEVICE AND A DISPLAY SLATE

CROSS-REFERENCE TO RELATED APPLICATIONS

This application claims the priority of Korean Patent Application No. 10-2021-0094110 filed on Jul. 19, 2021, in the Korean Intellectual Property Office, the disclosure of which is incorporated herein by reference.

BACKGROUND OF THE DISCLOSURE

Various types of electronic devices, such as smartphones, are becoming essential to many users. Due to more information and contents being created and becoming available, users ask for better products and services that enable increased access to such information.

SUMMARY OF THE DISCLOSURE

The inventive features described herein relate to a user device that can be electronically paired with a display slate, which is a non-wearable display device that is separate from but automatically detected to be in proximity to the user device. The user device may have a transceiver, a display screen and a processor that provides control to the transceiver and the display screen in relation to the electronically paired display slate, such that activation of the display screen on the user device is minimized when compared to a conventional art user device that is not configured to be electronically paired with the display slate.

DETAILED DESCRIPTION OF THE DISCLOSURE

As usage of electronic devices such as smartphones increase exponentially, the present inventor recognized that the display screen on a smartphone (or user device) gets activated too many times throughout day. The user will view his display screen to check various types of notifications, to access social media, to view album photos, or to simply check the current time.

Such frequent display screen activation causes undesirable power consumption and other inconveniences to the user. For example, the user needs to take out his or her smartphone from a pocket or bag to look at its screen, which increases the chances of the smartphone being dropped or damaged. Based upon such problem recognition, the present inventor conceived various features of the invention described in more detail hereafter in order to allow user relevant information to be provided onto a so-called display slate, without having to activate the display screen of the user device.

An exemplary user device can be a so-called smartphone that is in widespread use today. It can be understood that the inventive concepts and/or at least some of the features in the invention described herein can be implemented in cooperation with many other types of user devices, such as tablet computers, notebook computers, smartwatches, wearable devices, and various other electronic devices having wireless communication capabilities.

Here, it should be noted that the inventive concepts and/or at least some of the features in the invention described herein can be implemented in a so-called "display slate," which refers to a device having very basic functions and a display screen or display panel with minimal features. Such display slate can have a flat configuration or a non-flat (i.e., flexible or bent) configuration. Display screens can be based on LCDs, OLEDs, mini-LEDs, micro-LEDs, e-paper displays, or any other types of displays currently under development or to be developed in the near future.

The inventive concepts and/or at least some of the features in the invention described herein can be further explained in view of the attached Figures.

Figure 1:
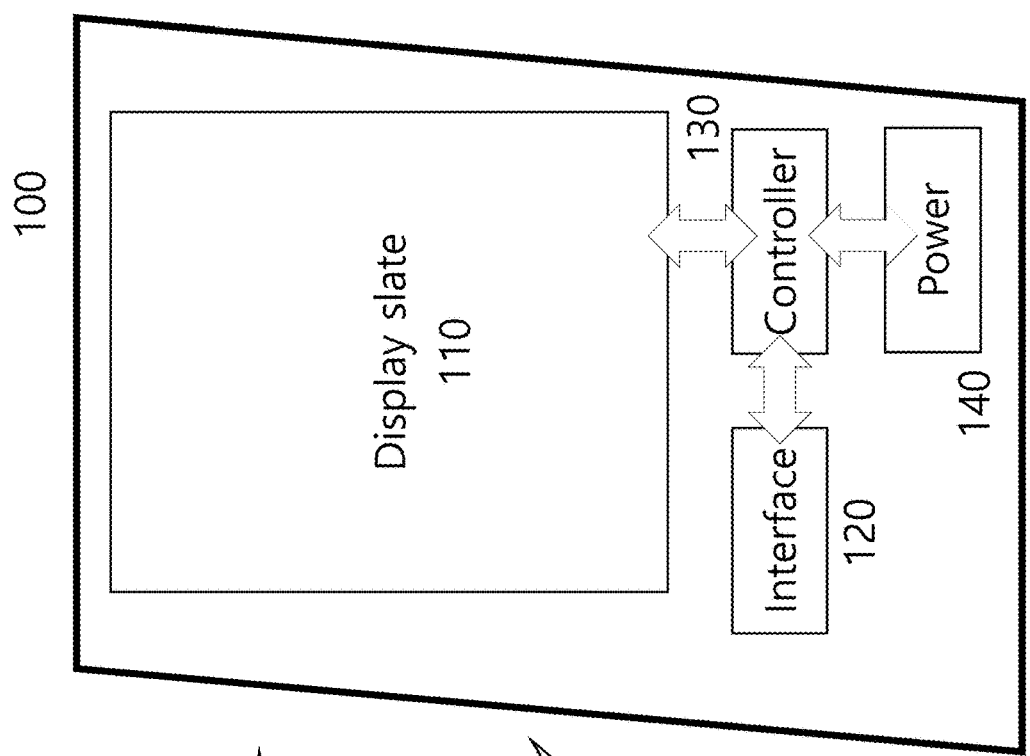
FIG. 1 depicts an exemplary embodiment for at least some of the features of the present invention.
Figure 1:
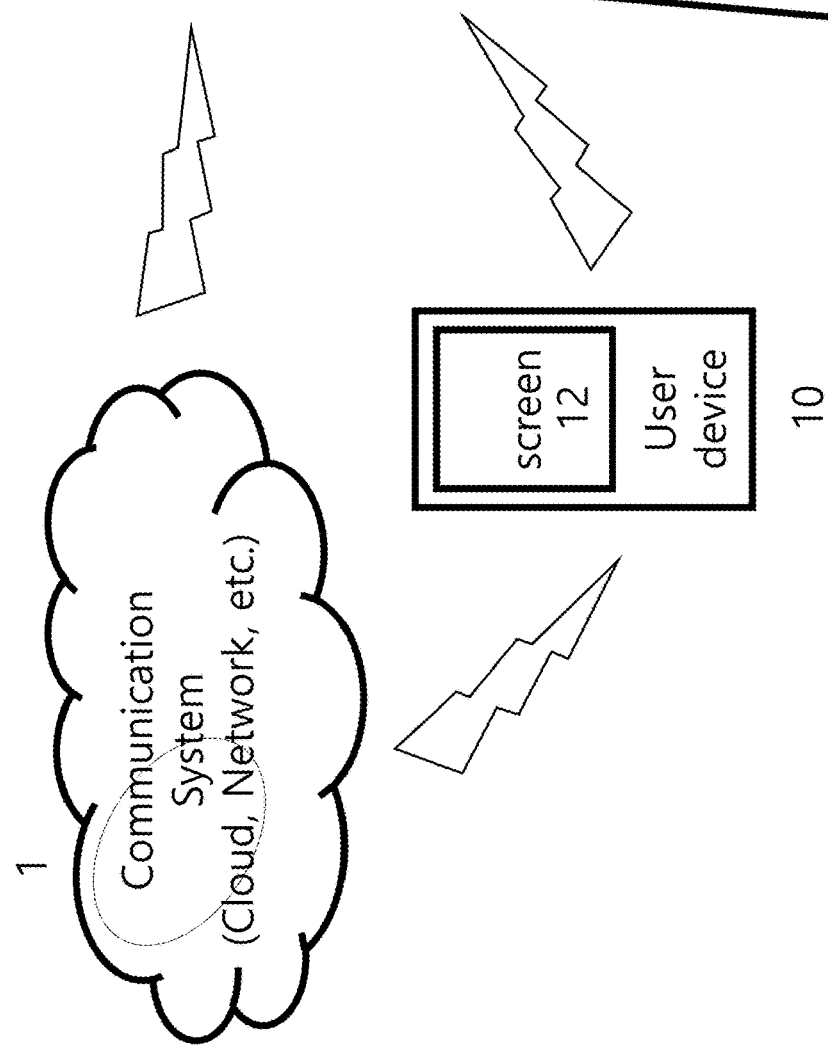

FIG. 1 depicts an exemplary embodiment for at least some of the features of the present invention. Here, a working or operational environment for a user device 10, the communication system 1 and an apparatus 100 (having a display slate 110) is depicted. The user device 10, which has a screen 12, can be in communication with the communication system 1 (i.e., cloud network, wireless network, etc.). Also, the user device 10 can be in communication with the apparatus 100 having the display slate 110. It should be noted that the apparatus 100 and the display slate 110 can be used interchangeably hereafter.

The apparatus 100 may have capabilities to send and receive signals and information with the user device 10, with the communication system 1, or with both. To enable such features, the apparatus 100 can have at least one power source 140 therein. The power source 140 can provide the necessary power based on a variety of configurations, including but not limited to, a power supply that can be plugged in to an outlet, a battery or energy storage, a solar panel or similar type of energy converting means, and the like.

In some embodiments and use case scenarios, the apparatus 100 may be configured to merely receive signals and data in a passive manner from the user device 10, the system/network 1, or both. Such passive form of the apparatus 100 can be manufactured and provided at low cost for widespread use. However, in other embodiments and use case scenarios, the apparatus 100 can have bi-directional communication capabilities that will provide additional features and conveniences to the user.

The electronic connection (i.e., communication link) between the user device 10 and the apparatus 100 can be established upon performing a so-called pairing operation. The involves the user device 10, the apparatus 100, or both to search for each other upon satisfaction of one or more conditions. It can be understood that such pairing or linking can be the same as or similar to how wireless earbuds and a smartphone are linked together via Bluetooth™ technology. Of course, various other types of wireless access technologies (and/or communication standards) can be used in the devices and apparatuses that support the inventive features described herein.

Figure 2:
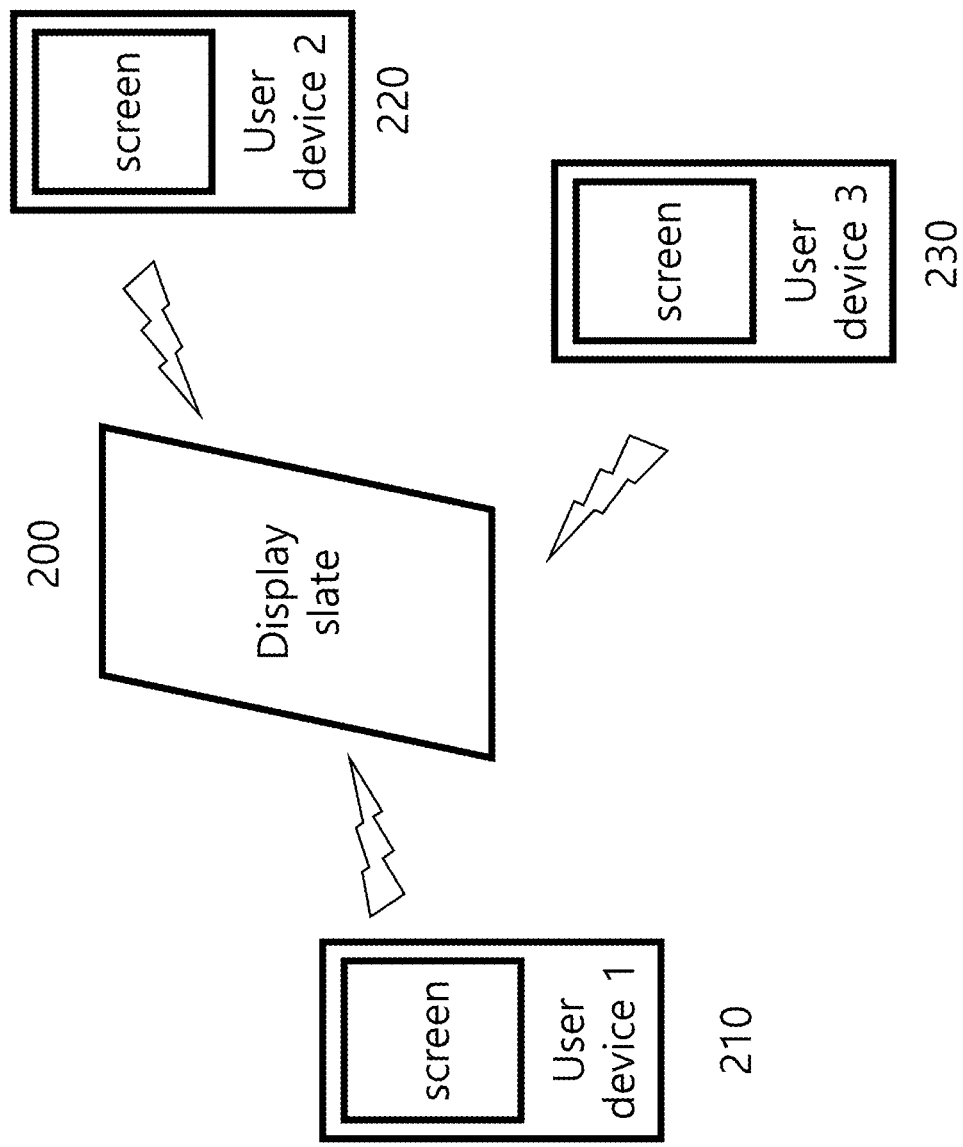
FIG. 2 depicts another exemplary embodiment for at least some of the features of the present invention.

FIG. 2 depicts another exemplary embodiment for at least some of the features of the present invention. Here, a working or operational environment for multiple user devices 210, 220, 230, and the apparatus 100 (having the display slate 110) is depicted.

The apparatus/display slate 200 can be configured to be accessed by and/or cooperate with a plurality of user devices (201, 220, 230), including user device 1, user device 2, and user device 3. It should be noted that potential signal or access collisions among the multiple user devices could occur. As such, an appropriate mechanism that avoids or minimized such collisions need to be implemented.

For example, the display slate 200 may be implemented to merely provide access to multiple user devices on a first-come-first-served basis. That is, if user device 1 requests access to the display slate 200 before the requests from user devices 2 and 3, then user device 1 will be authorized to connected with the display slate 200 first.

Alternatively, access to the display slate 200 may be priority based. As an example, each user of the user devices may have a subscription-based relationship with the owner of the display slate 200. Those users have a more expensive subscription will have priority over other user that have a basic subscription plan.

It can be understood that various other types of collision avoidance or handling mechanisms can be used in lieu of or in addition to those described above.

Figure 3:
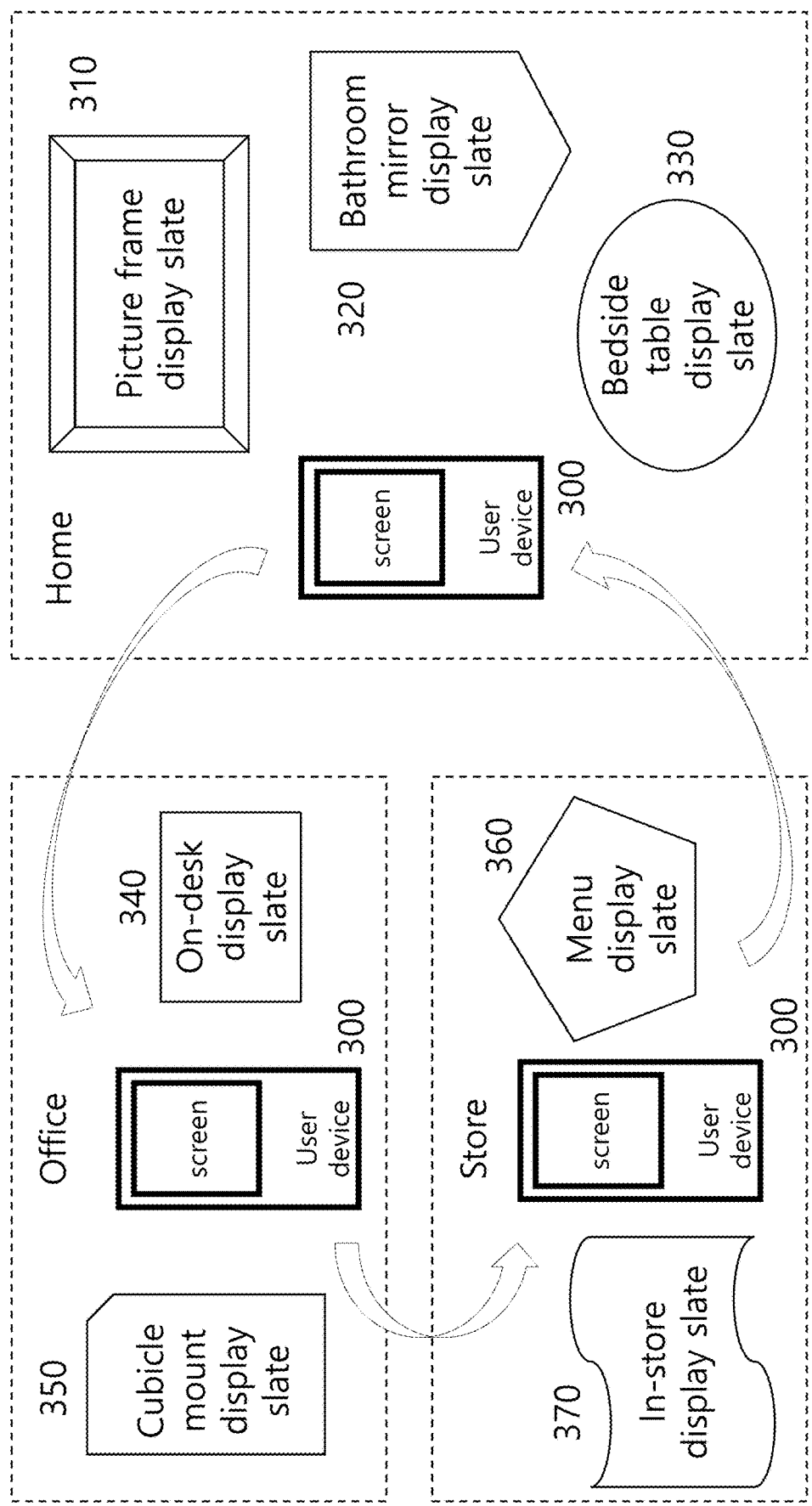
FIG. 3 depicts a further exemplary embodiment for at least some of the features of the present invention.

FIG. 3 depicts a further exemplary embodiment for at least some of the features of the present invention. Here, some working or operational environments for a user device 300 that is within different types of network-based areas (e.g., home, office, store, etc.) is depicted in relation to numerous different types display slates (310~370).

Within the home, numerous types of display slates can be provided at various locations. For example, the user can have at least one picture frame display slate 310 placed on the wall of his living room. In the restroom, a bathroom mirror display slate 320 can be mounted. In the bedroom, a bedside table display slate 330 can be installed.

The user, with his smartphone in his pocket, can simply walk through his home and have pre-settings that allow one or more display slates (310, 320, 330) to automatically or selectively pair up with his smartphone upon satisfaction of certain conditions (such as being within proximity range). For example, when the user is in the living room with his smartphone in his pocket but in proximity to the picture frame display slate 310, his user settings (or other pre-set control instructions) allow some or all photos stored in the smartphone to magically appear on the picture frame display slate 310 for his viewing pleasure. This is achieved without the user needing to pull out his smartphone and entering commands to interact with the picture frame display slate 310.

When it is time for bed, the user can simply place his smartphone onto a battery recharging surface inside a drawer of his bedside table, which still allows wireless pairing with the bedside table display slate 330 to allow his smartphone clock feature to be automatically displayed on the bedside table display slate 330 that he can view while laying down. Upon waking up in the morning, when the user enters his bathroom with his smartphone in a pocket of his pajamas, his smartphone and the bathroom mirror display slate 320 can automatically pair up to show news headlines based on his pre-requisite settings to provide such service.

After arriving at the office, the user may have an on-desk display slate 340 that can be viewed while sitting at his desk. Also, one or more cubicle mount display slates 350 can be placed around his work area. As with the home scenario, the user can have certain pre-set settings that allow him to view certain types of information on certain dedicated display slates that are automatically accessed by his smartphone that is within a pre-set operational range of the display slates.

In a store or restaurant, the user can access a menu display slate 360, an in-store display slate 370, and other types of display slates strategically placed in areas of customer interest throughout the store or restaurant. For example, via the menu display slate 360, the user's smartphone can show what the user had during his last visit and show today's specials and make recommendations regarding the menu. His smartphone can also pair up with the in-store display slate 370, which may have been pre-set to show other items of interest to the user.

Figure 4:
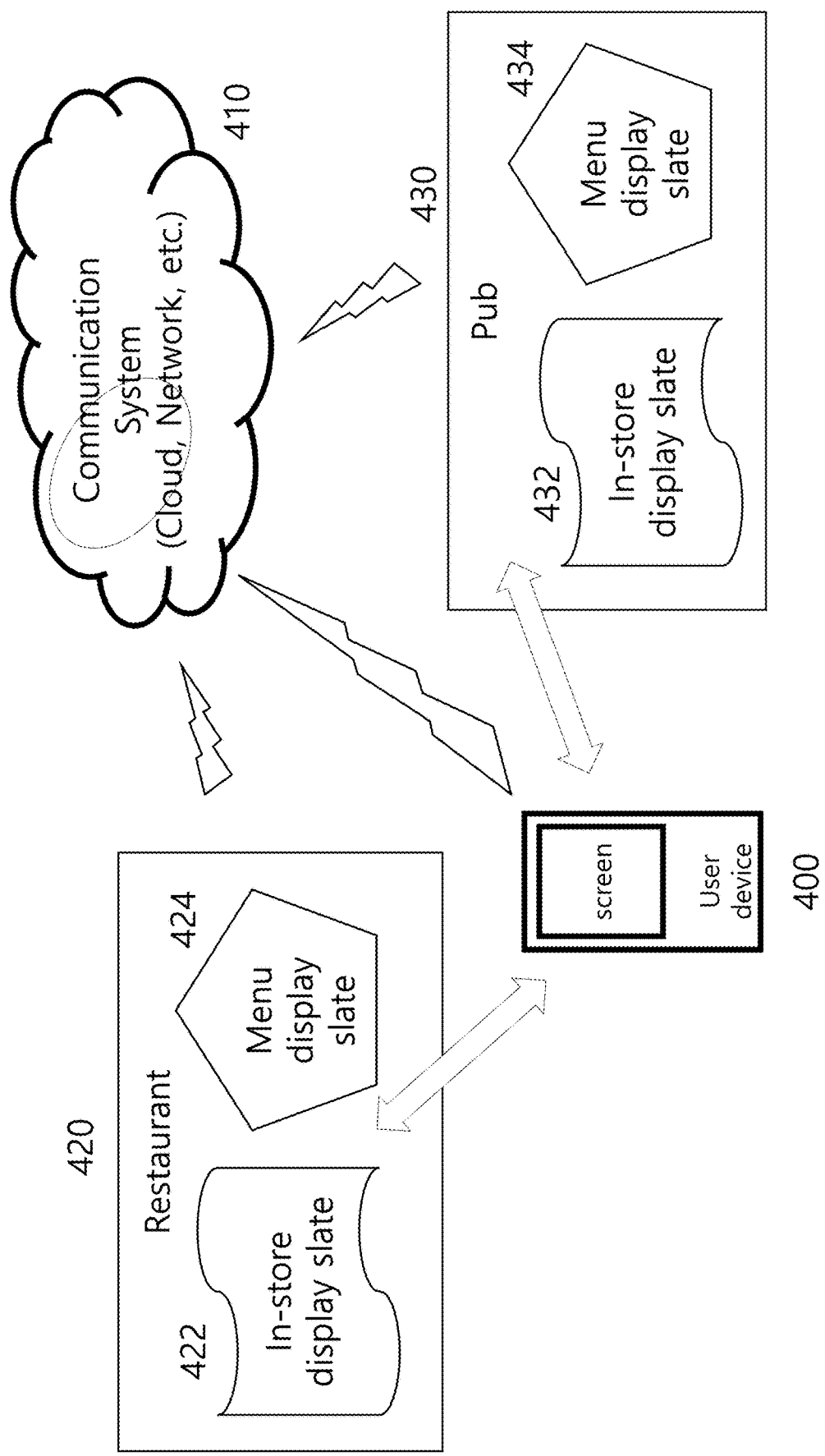
FIG. 4 depicts an additional exemplary embodiment for at least some of the features of the present invention.

FIG. 4 depicts an additional exemplary embodiment for at least some of the features of the present invention. Here is shown a situation where the user, with his smartphone (or user device) first visits a restaurant 420 and then later goes to a pub 430.

At the restaurant 420, the user device automatically pairs up with the menu display slate and/or the in-store display slate through which user relevant information can be shown to the user without the display screen on the user device having to be activated. Here, it should be noted that the restaurant owner and the pub owner can be a business-transaction relationship, which can allow advertisements for the pub to be displayed onto the display slates located in the restaurant.

Namely, a customer or patron referral service relationship can be pre-entered between the restaurant and the pub. For example, as the smartphone user is enjoying his meal at the restaurant with friends, an advertisement that shows special events on drinks at a nearby pub can be automatically displayed to the smartphone user via the in-store display slate, the menu display slate, etc. at the restaurant. Here, it should be noted that such advertisement need not be displayed on the smartphone itself. It just so happens that the smartphone user and his friends were contemplating where they should go after dinner. Upon seeing the pub specials, they decide to visit the pub which is located just down the street. As part of their customer referral service relationship, the owners of the restaurant and the pub can have a commission-based transaction when such referrals successfully take place. Here, it can be understood that many other types of advertisements or information can be provided to the user.

Figure 5:
FIG. 5 depicts some exemplary features within a user device of the present invention.
Figure 5:
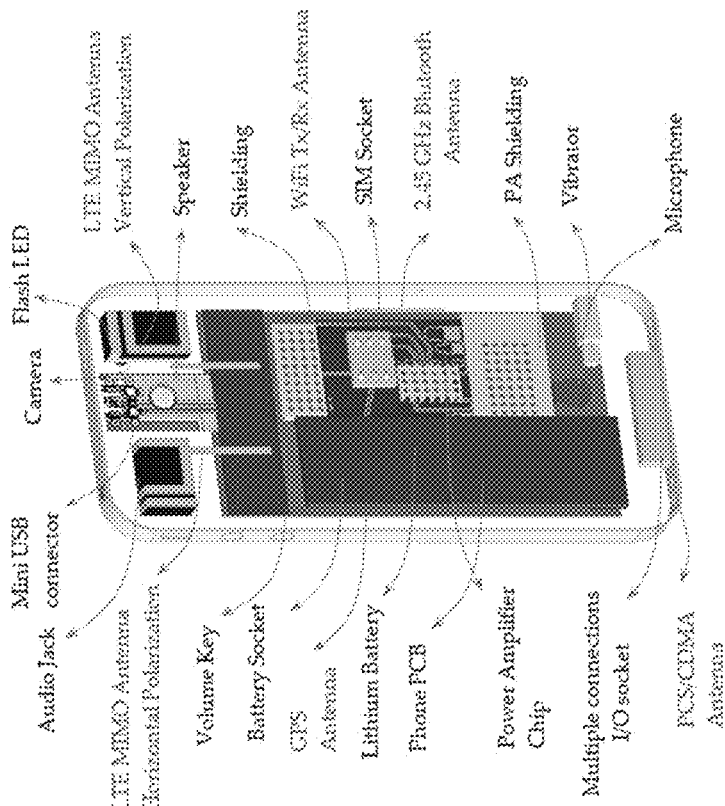

FIG. 5 depicts some exemplary features within a user device (e.g., smartphone) of the present invention. Here, a typical smartphone 510 or 520 can have multiple types of antennas adapted for different types of use. Some studies have shown that up to four Bluetooth™ antennas could be installed into a typical smartphone using the technology currently available. The features of the interactive display platform described herein can take advantage of such multiple antennas for automatically performing pairing operations with multiple display slates that are detected in proximity to the user.

Of course, antennas that support Wi-Fi and/or other types of wireless access, which are currently known and/or that shall be developed in the near future, can be alternatively and/or additionally used for the interactive display platform described herein.

Hereafter, certain inventive features of the interactive display platform will be additionally described to provide further understanding of the invention.

The inventive features relate to a method for an interactive display platform, the method comprising: performing a wireless pairing operation between a user device and at least one display slate located in proximity to the user device but not worn or physically attached to a user thereof; providing, on the display slate in a displayable manner, user relevant information related to or received from the user device without the user having to activate a screen of the user device; and allowing, via the display slate, the user to interact with the user relevant information provided thereon.

According to such method, the step of allowing the user to interact with the user relevant information permits at least one among web-based searching, content reproduction, content downloading, social media access, and commercial transactions to be subsequently performed by the user through the user device and/or the display slate. In such method, an owner of the display slate is not the same as the user of the user device, and the owner and the user can have a financial-transaction-based service relationship that allows the web-based searching, the content reproduction, the content downloading, the social media access, or the commercial transactions to be subsequently performed. In such method, the wireless pairing operation is based upon a wireless communication standard. In such method, the step of providing the user relevant information on the display slate is performed under a privacy control mechanism. In such method, the step of allowing the user to interact with the user relevant information is achieved through visual, audible or tactile inputs from the user detected by the display slate or by the user device. Such method further comprises: obtaining user authorization, prior to performing the wireless pairing operation, to allow the user relevant information to be provided on the display slate.

Also, the inventive features relate to an apparatus that cooperates with a user device, the apparatus comprising: a housing that is not meant to allow a user to wear or otherwise attach the apparatus to his body; an interface, at the housing, that allows data signals to be received from and sent to the user device in order to achieve a wireless pairing operation therewith; a display slate, at the housing and operatively connected with the interface, to provide images or visual outputs thereon; and a controller, at the housing and operatively connected with the interface and the display slate, that allows user relevant information to be provided on the display slate based upon the data signals received from and sent to the user device after completion of the wireless pairing operation, wherein the wireless pairing operation is automatically performed with the user device upon satisfaction of certain conditions with respect to at least one among a proximity between the apparatus and the user device, user settings, time of day, and operation status, which are related to the user device.

In such apparatus, the interface, the display slate and the controller are configured to have minimal features, when compared to corresponding components in a conventional display device or monitor, that are sufficient for performing at least the wireless pairing operation and to allow the user relevant information to be provided on the display slate. In such apparatus, the interface, under a control of the controller, is additionally supports capabilities of sending and receiving data signals directly with one or more servers of the communication system, in a cloud network or in a wireless network without going through the user device. In such apparatus, the display slate is typically in stand-by mode until the wireless pairing operation with the user device begins. In such apparatus, the display slate is configured to be touch-enabled. In such apparatus, the controller is configured to process a plurality of wireless pairing operations from a plurality of user devices based upon pre-set conditions such that multiple wireless pairing operations are handled in sequence, in priority order, or in some other manner that avoids access collisions among the plurality of user devices. Such apparatus further comprised: at least one power source that provides necessary power to at least one among the interface, the display slate and the controller.

Additionally, the inventive features relate to a user device that interacts with a display slate, the device comprising: a transceiver that allows data signals to be sent to and received from the display slate in order to achieve a wireless pairing operation therewith; a display screen, operatively connected with the transceiver, configured to provide visual information to a user of the user device; and a processor, operatively connected with the transceiver, to perform interactions with the display slate without having to activate the display screen of the user device, wherein the display slate is not worn or physically attached to the user of the user device.

In such apparatus, the processor and the transceiver cooperate to automatically perform the wireless pairing operation when the user device is detected to be within a certain proximity of or upon satisfaction of certain conditions with respect to the display slate. In such apparatus, the processor and the transceiver support a wireless communication standard used in the wireless pairing operation. In such apparatus, the processor and the transceiver cooperate to automatically perform the wireless pairing operation with a plurality of display slates based upon pre-set conditions such that multiple wireless pairing operations are handled in sequence, in priority order, or in some other manner that avoids access collisions. Such apparatus further comprises: more than one wireless communication antennas respectively configured to cooperate with the processor and the transceiver. In such apparatus, the transceiver, the display screen and the processor are part of a smartphone.

Furthermore, the inventive features relate to a method of operation between a user device and a display slate, the method comprising: obtaining authorization, from at least one among a user of the user device and an owner of the display slate, to allow a wireless pairing operation when the user device is detected to be within a certain proximity of or upon satisfaction of certain conditions with respect to the display slate; allowing an interaction, via at least one among the user device and the display slate, to be performed between the user and the owner; and providing a result of the interaction based upon a type or method of the interaction performed between the user and the owner, wherein the display slate is not worn or physically attached to the user of the user device.

In such method, the obtaining step, the allowing step and the providing step are performed between the user and the owner having a content service-based relationship that allows contents or services to be provided. In such apparatus, the interaction is related to at least one among web-based searching, content reproduction, content downloading, social media access, and commercial transactions performed by the user through the user device and/or the display slate. In such apparatus, the interaction is achieved through visual, audible or tactile inputs from the user detected by the display slate or by the user device. In such apparatus, the obtaining step, the allowing step and the providing step are performed in relation to the display slate that is wirelessly paired with a smartphone.

Even furthermore, the inventive features relate to a user device comprising: a transceiver configured to allow the user device to be electronically paired with at least one display slate, which is a non-wearable display device that is separate from but automatically detectable when in proximity to the user device; a display screen, cooperating with the transceiver, configured to display information thereon; and a processor, providing control to the transceiver and the display screen in relation to the electronically paired display slate, configured to minimize activation of the display screen on the user device when compared to a conventional art user device that is not configured to be electronically paired with the display slate.

In such device, the transceiver and the processor allow information, which would otherwise be displayed on the display screen of the user device, to be shown on the display slate without activating the display screen of the user device. In such device, the transceiver and the processor allow a user of the user device approach and be electronically paired with the display slate, which is configured to be detachably fixed to a particular object or at a particular location, without the user having to move the display slate towards him. In such device, the transceiver and the processor allow the user of the user device to perform at least one among web-based searching, content reproduction, content downloading, social media access, and commercial transactions via the display slate. In such device, the transceiver and the processor allow the user of the user device and an owner of the display slate to conduct at least one among a business transaction and an information exchange operation with each other via an interaction with the display slate.

What is claimed is:

1. A user device that interacts with a display slate, the device comprising:
   a transceiver that allows data signals to be sent to and received from the display slate in order to achieve a wireless pairing operation therewith;
   a display screen, operatively connected with the transceiver, configured to provide visual information to a user of the user device; and
   a processor, operatively connected with the transceiver, to perform interactions with the display slate without having to activate the display screen of the user device,
   wherein the display slate is not worn or physically attached to the user of the user device,
   wherein the processor and the transceiver cooperate to automatically perform the wireless pairing operation when the user device is detected to be within a certain proximity of or upon satisfaction of certain conditions with respect to the display slate,
   wherein the processor and the transceiver support a wireless communication standard used in the wireless pairing operation, and
   wherein the processor and the transceiver cooperate to automatically perform the wireless pairing operation with a plurality of display slates based upon pre-set conditions such that multiple wireless pairing operations are handled in sequence, in priority order, or in some other manner that avoids access collisions.

2. The device of claim 1, wherein the transceiver, the display screen and the processor are part of at least one among a smartphone, a tablet computer, a notebook computer, a smartwatch, a wearable device, and an electronic device having wireless communication capabilities.

3. The device of claim 1, wherein the wireless pairing operation is based on Bluetooth technology.

4. The device of claim 1, wherein the interactions with the display slate permits at least one among web-based searching, content reproduction, content downloading, social media access, and commercial transactions to be subsequently performed by the user through the user device and/or the display slate.

5. The device of claim 1, wherein an owner of the display slate is not the same as the user of the user device, and the owner and the user can have a financial-transaction-based service relationship that allows the web-based searching, the content reproduction, the content downloading, the social media access, or the commercial transactions to be subsequently performed.

6. The device of claim 1, wherein the transceiver, the display screen and the processor cooperate for providing the user relevant information on the display slate is performed under a privacy control mechanism.

7. The device of claim 1, wherein the transceiver, the display screen and the processor cooperate for allowing the user to interact with the user relevant information is achieved through visual, audible or tactile inputs from the user detected by the display slate or by the user device.

8. The device of claim 1, wherein the transceiver, the display screen and the processor cooperate for obtaining user authorization, prior to performing the wireless pairing operation, to allow the user relevant information to be provided on the display slate.

9. A user device that interacts with a display slate, the device comprising:
   a transceiver that allows data signals to be sent to and received from the display slate in order to achieve a wireless pairing operation therewith;
   a display screen, operatively connected with the transceiver, configured to provide visual information to a user of the user device; and
   a processor, operatively connected with the transceiver, to perform interactions with the display slate without having to activate the display screen of the user device,
   wherein the display slate is not worn or physically attached to the user of the user device,
   wherein the processor and the transceiver cooperate to automatically perform the wireless pairing operation when the user device is detected to be within a certain proximity of or upon satisfaction of certain conditions with respect to the display slate,
   wherein the processor and the transceiver support a wireless communication standard used in the wireless pairing operation,
   wherein the processor and the transceiver cooperate to automatically perform the wireless pairing operation with a plurality of display slates based upon pre-set conditions such that multiple wireless pairing operations are handled in sequence, in priority order, or in some other manner that avoids access collisions; and
   more than one wireless communication antennas respectively configured to cooperate with the processor and the transceiver, wherein the transceiver, the display screen and the processor are part of a smartphone.

10. The device of claim 9, wherein the wireless pairing operation is based on Bluetooth technology.

11. The device of claim 9, wherein the interactions with the display slate permits at least one among web-based searching, content reproduction, content downloading, social media access, and commercial transactions to be subsequently performed by the user through the user device and/or the display slate.

12. The device of claim 9, wherein an owner of the display slate is not the same as the user of the user device, and the owner and the user can have a financial-transaction-based service relationship that allows the web-based searching, the content reproduction, the content downloading, the social media access, or the commercial transactions to be subsequently performed.

13. The device of claim 9, wherein the transceiver, the display screen and the processor cooperate for providing the user relevant information on the display slate is performed under a privacy control mechanism.

14. The device of claim 9, wherein the transceiver, the display screen and the processor cooperate for allowing the user to interact with the user relevant information is achieved through visual, audible or tactile inputs from the user detected by the display slate or by the user device.

15. The device of claim 9, wherein the transceiver, the display screen and the processor cooperate for obtaining user authorization, prior to performing the wireless pairing operation, to allow the user relevant information to be provided on the display slate.

16. A method for a user device that interacts with a display slate, the method comprising:
  allowing, by a transceiver, data signals to be sent to and received from the display slate in order to achieve a wireless pairing operation therewith;
  providing, via a display screen operatively connected with the transceiver, visual information to a user of the user device; and
  performing, by a processor operatively connected with the transceiver, interactions with the display slate without having to activate the display screen of the user device,
  wherein the display slate is not worn or physically attached to the user of the user device,
  wherein the processor and the transceiver cooperate to automatically perform the wireless pairing operation when the user device is detected to be within a certain proximity of or upon satisfaction of certain conditions with respect to the display slate,
  wherein the processor and the transceiver support a wireless communication standard used in the wireless pairing operation, and
  wherein the processor and the transceiver cooperate to automatically perform the wireless pairing operation with a plurality of display slates based upon pre-set conditions such that multiple wireless pairing operations are handled in sequence, in priority order, or in some other manner that avoids access collisions.

17. The method of claim 16, wherein an owner of the display slate is not the same as the user of the user device, and the owner and the user can have a financial-transaction-based service relationship that allows the web-based searching, the content reproduction, the content downloading, the social media access, or the commercial transactions to be subsequently performed.

18. The method of claim 16, wherein the step of providing the user relevant information on the display slate is performed under a privacy control mechanism.

19. The method of claim 16, wherein the step of allowing the user to interact with the user relevant information is achieved through visual, audible or tactile inputs from the user detected by the display slate or by the user device.

20. The method of claim 16, further comprising: obtaining user authorization, prior to performing the wireless pairing operation, to allow the user relevant information to be provided on the display slate.

* * * * *